United States Patent
Li et al.

(10) Patent No.: US 11,777,567 B2
(45) Date of Patent: Oct. 3, 2023

(54) INDEPENDENT TRANSMIT AND RECEIVE CHANNEL CALIBRATION FOR MULTIPLE-INPUT MULTIPLE-OUTPUT (MIMO) SYSTEMS

(71) Applicant: Aptiv Technologies Limited, St. Michael (BB)

(72) Inventors: Zhengzheng Li, Agoura Hills, CA (US); Yu Zhang, Thousand Oaks, CA (US); Shuimei Zhang, Oak Park, CA (US); Xin Zhang, Agoura Hills, CA (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/653,641

(22) Filed: Mar. 4, 2022

(65) Prior Publication Data

US 2022/0368388 A1    Nov. 17, 2022

Related U.S. Application Data (60) Provisional application No. 63/231,132, filed on Aug. 9, 2021, provisional application No. 63/182,729, filed on Apr. 30, 2021.

(51) Int. Cl.
*H04B 7/0456* (2017.01)
*H04B 17/11* (2015.01)
*H04B 17/21* (2015.01)

(52) U.S. Cl.
CPC ........... *H04B 7/0486* (2013.01); *H04B 17/11* (2015.01); *H04B 17/21* (2015.01)

(58) Field of Classification Search
CPC ...... H04B 7/0486; H04B 17/11; H04B 17/21; G01S 13/878; G01S 7/4004
See application file for complete search history.

(56) References Cited

U.S. PATENT DOCUMENTS 8,638,871 B2 * 1/2014 Krauss ................. H04B 7/0413
375/267
10,187,134 B1 * 1/2019 Bialer .................... H04B 7/043
(Continued)

FOREIGN PATENT DOCUMENTS

| WO | 2019146644 A1 | 8/2019 |
| WO | 2022139639 A1 | 6/2022 |

OTHER PUBLICATIONS

"Extended European Search Report", EP Application No. 22166749.6, dated Sep. 27, 2022, 7 pages.
(Continued)

*Primary Examiner* — Sung S Ahn
(74) *Attorney, Agent, or Firm* — Sawtooth Patent Group PLLC (57) ABSTRACT

This document describes techniques and systems for independent transmit and receive channel calibration for multiple-input multiple-output (MIMO) systems. Antenna responses are collected from each virtual channel of a MIMO system at an angle respective to an object. The transmit components and the receive components of the virtual channels are separated and organized into vectors (one for the transmit components and one for the receive components). Calibration values for elements of the vectors are computed and maintained in a transmit calibration matrix and a receive calibration matrix, respectively. Together, the transmit calibration matrix and the receive calibration matrix may include fewer elements than a calibration matrix for the virtual channels and, therefore, may require less memory and fewer computations to calibrate a MIMO system than using other calibration techniques. As such, described is a less expensive and less complex way to calibrate MIMO system by accurately approximating an ideal antenna array.

20 Claims, 8 Drawing Sheets

(56) References Cited

U.S. PATENT DOCUMENTS

2020/0252056 A1    8/2020   Alsuhaili
2021/0288699 A1*   9/2021   Hirabe ................. H04B 7/0456

OTHER PUBLICATIONS

Hung, "Matrix-Construction Calibration Method for Antenna Arrays", IEEE Transactions on Aerospace and Electronic Systems, vol. 36, No. 3, Jul. 2020, pp. 819-828.
Wang, et al., "Mutual Coupling Calibration of DBF Array With Combined Optimization Method", IEEE Transactions on Antennas and Propagation, vol. 51, No. 10, Oct. 2003, pp. 2947-2952.

* cited by examiner

INDEPENDENT TRANSMIT AND RECEIVE CHANNEL CALIBRATION FOR MULTIPLE-INPUT MULTIPLE-OUTPUT (MIMO) SYSTEMS

CROSS-REFERENCE TO RELATED APPLICATIONS

This application claims the benefit of U.S. Provisional Patent Application No. 63/231,132, filed Aug. 9, 2021, and U.S. Provisional Patent Application No. 63/182,729, filed Apr. 30, 2021, the disclosure of which are hereby incorporated by reference in their entities here.

BACKGROUND

Multiple-input multiple-output (MIMO) antenna array systems are a common approach for many radar system applications. MIMO systems generally consist of some quantity of physical channels, including a quantity of transmit channels and a quantity of receive channels. In MIMO, the physical channels are mapped to an array of virtual channels of greater quantity than the physical channels. For example, a MIMO system with four physical transmit channels and four physical receive channels can form a virtual array of sixteen transmit-receive channels. Adding more physical channels can exponentially increase the quantity of virtual channels, but this also adds costs.

Due to factors including mutual coupling or differences in transmission line length for each physical channel, calibration is often used to compensate an antenna response to match an ideal antenna array response. However, having a large quantity of virtual channels can make MIMO calibration expensive and complex, requiring greater use of computing resources.

SUMMARY

This document describes techniques and systems for independent transmit and receive channel calibration for multiple-input multiple-output (MIMO) systems. Antenna responses are collected from each virtual channel of a MIMO system at an angle respective to an object. The transmit components and the receive components of the virtual channels are separated and organized into vectors (one for the transmit components and one for the receive components). Calibration values for elements of the vectors are computed and maintained in a transmit calibration matrix and a receive calibration matrix, respectively. Together, the transmit calibration matrix and the receive calibration matrix may include fewer elements than a calibration matrix for the virtual channels and, therefore, may require less memory and fewer computations to calibrate a MIMO system than using other calibration techniques. As such, described is a less expensive and less complex way to calibrate MIMO system by accurately approximating an ideal antenna array.

In one example, a method includes collecting, based on signals obtained via a MIMO antenna array system, channel responses for an angle within a field-of-view of a sensor. The method further includes generating, based on the channel responses, an observation matrix including elements for each of the channel responses. The method further includes decomposing the elements of the observation matrix into a transmit vector associated with transmit components of the MIMO antenna array system. The method further includes decomposing the elements of the observation matrix into a receive vector associated with receive components of the MIMO antenna array system. The method further includes computing, based on the transmit vector, transmit calibration values particular to the transmit components of the MIMO antenna array system. The method further includes computing, based on the receive vector, receive calibration values particular to the receive components of the MIMO antenna array system. The method further includes maintaining the transmit calibration values and the receive calibration values as a respective transmit calibration matrix and receive calibration matrix for enabling the sensor to calibrate a beam vector transmitted or received via the MIMO antenna array system.

This Summary introduces simplified concepts related to independent transmit and receive channel calibration for MIMO systems, further described in the Detailed Description and Drawings. This Summary is not intended to identify essential features of the claimed subject matter, nor is it intended for use in determining the scope of the claimed subject matter. That is, one problem solved by the described techniques is reducing the quantity of calibration computations and the memory required to store the calibration data to enable a less expensive and less complex calibration process that accurately approximates an ideal antenna array for MIMO applications. Therefore, although primarily described in the context of improving radar system functionality of a vehicle, independent transmit and receive channel calibration for MIMO systems can be applied to other applications where fewer computations and less memory are desired for MIMO antenna array calibration.

BRIEF DESCRIPTION OF THE DRAWINGS

The details of one or more aspects of independent transmit and receive channel calibration for MIMO systems are described in this document with reference to the following figures:

FIG. 8-1 illustrates an example implementation of independent transmit and receive channel calibration for a MIMO radar system using a bistatic chamber configuration, in accordance with techniques and systems of this disclosure; and FIG. 8-2 illustrates an example implementation of independent transmit and receive channel calibration for a MIMO radar system using a bistatic radar configuration, in accordance with techniques and systems of this disclosure.

The same numbers are often used throughout the drawings to reference like features and components.

DETAILED DESCRIPTION

Overview

Radar systems are utilized in many applications, including autonomous and semi-autonomous vehicles. MIMO radar systems (radar systems utilizing a MIMO antenna array system) are particularly suited for vehicles (e.g., automobiles, watercraft, aircraft) because the MIMO radar systems are able to detect and track multiple objects simultaneously. Adding more channels to MIMO radar systems may improve the accuracy of radar detections and object tracking of multiple objects as a result.

A MIMO radar system may utilize a physical array including multiple transmit and receive channels that are essentially signal paths that propagate signals between antennas and transmitters or receivers (e.g., transceivers). A greater quantity of transmit and receive channels results in more virtual channels and a larger synthetic aperture. The larger synthetic aperture may provide higher angular resolution, which, in turn, enables the MIMO radar system to differentiate more accurately between objects near each other. For example, four physical transmit channels and four physical receive channels can form a virtual array of sixteen transmit-receive channels. Doubling the physical transmit and receive channels to eight apiece can form a virtual array of sixty-four transmit-receive channels.

Due to mutual coupling, transmission line differences, the presence of a radome, or other factors, calibration is often used to correct for errors in actual antenna array responses of a MIMO radar system to match an ideal array response. Calibrating the MIMO channels may be costly in terms of memory and computations due to the large quantity of virtual channels. In some MIMO systems, a full calibration matrix can be used to compensate for all the virtual channels and their associated mutual couplings. Referring to the previous example, for a virtual array of sixteen transmit-receive channels, a 16×16 full calibration matrix (256 elements) is needed. As more channels are added, the full calibration matrix grows exponentially. If the quantity of physical transmit channels and receive channels was increased to eight each, a 64×64 full calibration matrix (4096 elements) would be required of sixty-four virtual channels. Adding more channels to a MIMO radar system is desirable for improved object tracking and detections, particularly in a busy environment, such as a driving scenario where a vehicle is driving on a road with other vehicles, pedestrians, and obstacles to avoid. The memory and computational complexity to process radar signals transmitted or received using a MIMO array increases proportionately to the size of the full calibration matrix.

Mutual couplings among the virtual channels are not independent as they stem from the mutual couplings of the physical antenna elements or antennas. This means that the mutual coupling of a virtual channel includes two components, a transmit component that is affected by neighboring (e.g., nearby) physical transmit channels and a receive component that is affected by neighboring (e.g., nearby) physical receive channels. Since a MIMO radar system measures a round trip channel response from the transmit channel to the receive channel (the virtual channel formed by the transmit channel and the receive channel), the transmit component and the receive component of the mutual coupling are combined in the channel response. The techniques and systems described herein separate the combined channel response into a transmit component and a receive component. A transmit calibration matrix for the physical transmit channels and a receive calibration matrix for the physical receive channels can be generated. The combined elements of these two matrices are exponentially less than a full calibration matrix for the virtual channels. By using these techniques and systems, less memory and computations may be required for calibrating the MIMO radar system.

Example Environment

Figure 1:
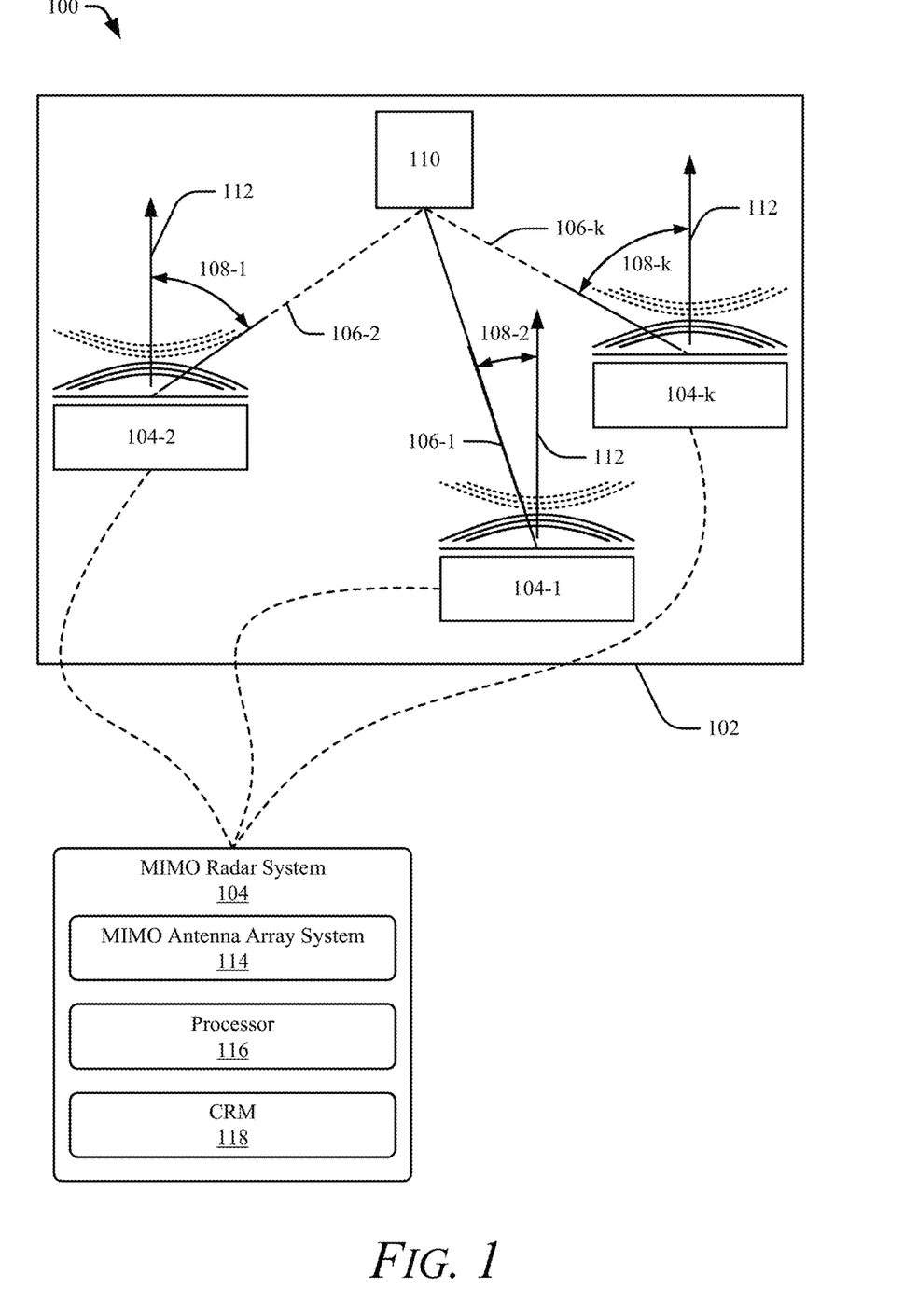
FIG. 1 illustrates an example environment in which independent transmit and receive channel calibration for a MIMO radar system can be applied, in accordance with techniques and systems of this disclosure.

FIG. 1 illustrates an example environment 100 in which independent transmit and receive channel calibration for a MIMO radar system 104 can be applied in accordance with techniques and systems of this disclosure. Environment 100 includes a calibration chamber 102 for calibrating the MIMO radar system 104, which in this example, includes a plurality of MIMO radar systems 104-1 to 104-k. Likewise, other environments may be used as an alternative to the calibration chamber 102. Any environment conducive to calibrating a MIMO radar system can be used.

For ease of description, the plurality of MIMO radar systems 104-1 to 104-k are described as one MIMO radar system 104 collecting channel responses 106 (e.g., respective channel responses 106-1 through 106-k) from one or more angles 108 (e.g., respective angles 108-1 to 108-k angles) reflected off of an object 110. The angles 108 may be measured relative to a common axis 112. The plurality of MIMO radar systems 104-1 to 104-k can also be separate and distinct MIMO radar systems, collecting channel responses 106 from up to k angles 108.

The MIMO radar system 104 can be mounted to any moving platform that can travel on the road. For example, manufacturers can integrate features of the MIMO radar system 104, such as one or more radar sensors, into a side mirror, roof, bumper, or any other interior or exterior location where the FOV includes the road and any targets, moving or stationary, that are near the road.

The MIMO radar system 104 comprises a computer-readable storage medium (CRM) 118 configured to store machine-readable instructions that, when executed by a processor 116 or other logic of the MIMO radar system 104, cause the processor 116 or other logic to transmit and receive electromagnetic energy to detect and identify objects, such as the object 110. The MIMO radar system 104 may include a combination of hardware, software, and/or firmware for detecting objects, such as, for an automotive system.

At least one object 110 can be present in the calibration chamber 102. The MIMO radar system 104 transmits an electromagnetic beam (e.g., a beam vector) and receives the reflected beam by the object 110 as channels responses 106. Each virtual transmit-receive channel of the MIMO radar system 104 has an associated channel response 106. For example, channel responses 106-1 is a plurality of channel responses, and the quantity of channel responses is equal to the quantity of virtual transmit-receive channels of the MIMO radar system 104-1.

The MIMO radar system 104 transmits and receives electromagnetic signals (e.g., via a MIMO antenna array system 114). The MIMO antenna array system 114 includes transmit components and receive components. The transmit components may include one or more transmit antennas, one or more transmitters, and the circuitry that couples the transmit antennas to the transmitters. Likewise, the receive components may include one or more receive antennas, one or more receivers, and the circuitry that couples the receive antennas to the receivers.

The MIMO radar system 104 includes processing hardware that may include the processor 116 and the CRM 118. The processor 116 can be multiple separate or a single microprocessor, one or more system-on-chips of a computing device, a controller, or a control unit. The processor 116 executes computer-executable instructions stored within the CRM 118.

A calibration technique or system, as described herein, collects the channels responses 106 of the MIMO radar system(s) 104 for each angle 108 from which the MIMO radar system 104 transmits and receives an electromagnetic beam. The channel responses 106 are factored, separating portions of each channel response associated with the transmit components from portions of each channel response associated with the receive components. The transmit component and receive component portions are compared to ideal steering vectors for each portion, respectively, and a transmit calibration matrix and a receive calibration matrix are generated. The transmit calibration matrix and a receive calibration matrix may be stored in the CRM 118. Because these two matrices may be much smaller than one full calibration matrix for all possible virtual channels, the required memory of the CRM 118 and the required computations of the processor 116 may be reduced by an exponential factor compared with other techniques for calibrating MIMO systems.

Figure 2:
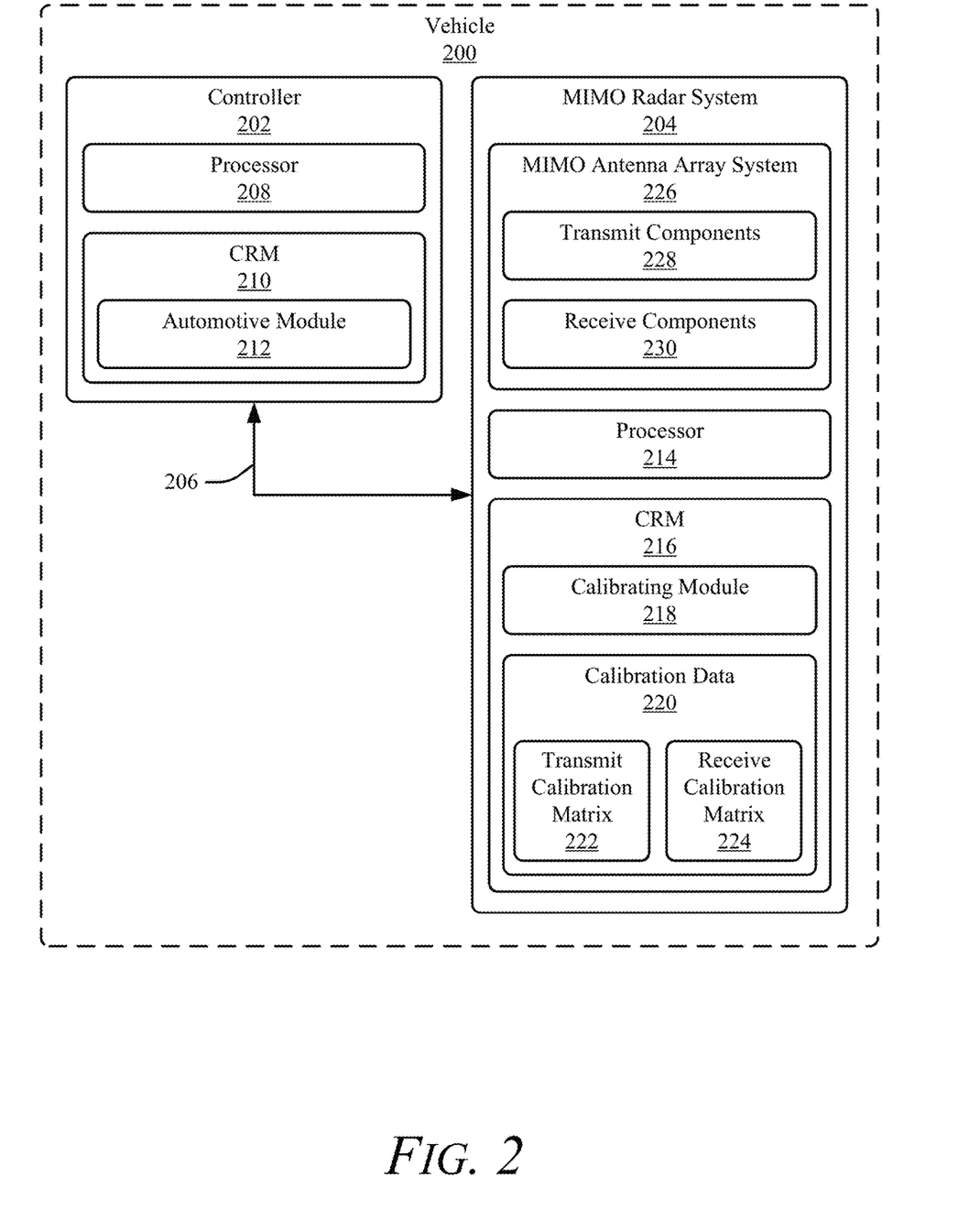
FIG. 2 illustrates an example vehicle in which independent transmit and receive channel calibration for a MIMO radar system can be applied, in accordance with techniques and systems of this disclosure.

FIG. 2 illustrates an example vehicle 200 in which independent transmit and receive channel calibration for a MIMO radar system can be applied in accordance with techniques and systems of this disclosure. The vehicle 200 can represent a car or other types of vehicles and machinery (e.g., a motorcycle, a bus, a tractor, a semi-trailer truck, watercraft, aircraft, or other heavy equipment), including manned and unmanned systems that may be used for a variety of purposes. For this example, the vehicle 200 is a car traveling a road. Moving or stationary objects may be in or near the road, for example, a truck or a pedestrian.

The vehicle 200 includes a controller 202 and the MIMO radar system 204, which is an example of the MIMO radar system 104. The MIMO radar system 204 is calibrated using independent transmit and receive channel calibration techniques described herein. The controller 202 and the MIMO radar system 204 communicate over a link 206. The link 206 may be a wired or wireless link and, in some cases, includes a communication bus. The controller 202 performs operations based on information received from the MIMO radar system 204, over the link 206, such as data output from the MIMO radar system 204, including information indicative of one or more objects identified and tracked in a field-of-view (FOV).

The controller 202 includes a processor 208 and a CRM 210, which stores instructions for an automotive module 212. The MIMO radar system, likewise, includes processing hardware that may include a processor 214 and a CRM 216. The processors 208 and 214 can take various forms, such as one of the many examples stated above with regard to the processor 116. For example, the processors 208 and 214 execute computer-executable instructions stored within the CRMs 210 and 216, each of which can likewise take various forms, such as one of the many examples stated above with regard to the CRM 118.

The processor 208 can execute the automotive module 212 to perform a driving function or other operation of the vehicle 200, which may include using output from the MIMO radar system 204 to assist in determining driving decisions. For example, the automotive module 212 can provide automatic cruise control and monitor the MIMO radar system 204 for output that indicates the presence of objects in the FOV, for instance, to slow the speed and prevent a collision with a vehicle or a pedestrian. The automotive module 212 may provide alerts or perform a specific maneuver when the data obtained from the MIMO radar system 204 indicates that one or more objects are crossing in front of the vehicle 200.

The CRM 216 stores a calibrating module 218 and calibration data 220. Alternatively, the calibration module 218 can be stored in the CRM 210 or on a remote system (e.g., a laptop or other computer used during calibration). During calibration of the MIMO radar system 204, the calibrating module 218 collects channel responses 106 of the MIMO radar system 204 and generates a transmit calibration matrix 222 and a receive calibration matrix 224. The transmit calibration matrix 222 and the receive calibration matrix 224 are stored in CRM 216 and are used by the MIMO radar system 204 to approximate an ideal steering beam.

The MIMO radar system 204 includes a MIMO antenna array system 226. The radar system 204 can detect objects in the FOV based on radar signals transmitted and received by the MIMO antenna array system 226 via transmit components 228 and receive components 230. The transmit calibration matrix 222 corrects the transmit components 228, and the receive calibration matrix 224 corrects the receive components 230, each correction being to approximate an ideal steering beam transmitted and received by the MIMO antenna array system 226. By approximating an ideal steering beam associated with the MIMO antenna array system 226, the MIMO radar system 204 improves its accuracy.

The transmit components 228 include one or more physical transmit channels (e.g., transmit antennas, transmitters, coupling circuitry), and the receive components 230 include one or more physical receive channels (e.g., transmit antennas, transmitters, coupling circuitry). Together, the physical transmit channels and the physical receive channels can be combined to form an array of virtual channels. The quantity of virtual channels in the array depends on the quantity of physical transmit and receive channels. A greater quantity of physical transmit and receive channels can form a larger array of virtual channels. Calibrating a large array of virtual channels using a full calibration matrix may require much more computations and memory than calibrating the physical transmit and receive channels with their own respective calibration matrices.

Figure 3:
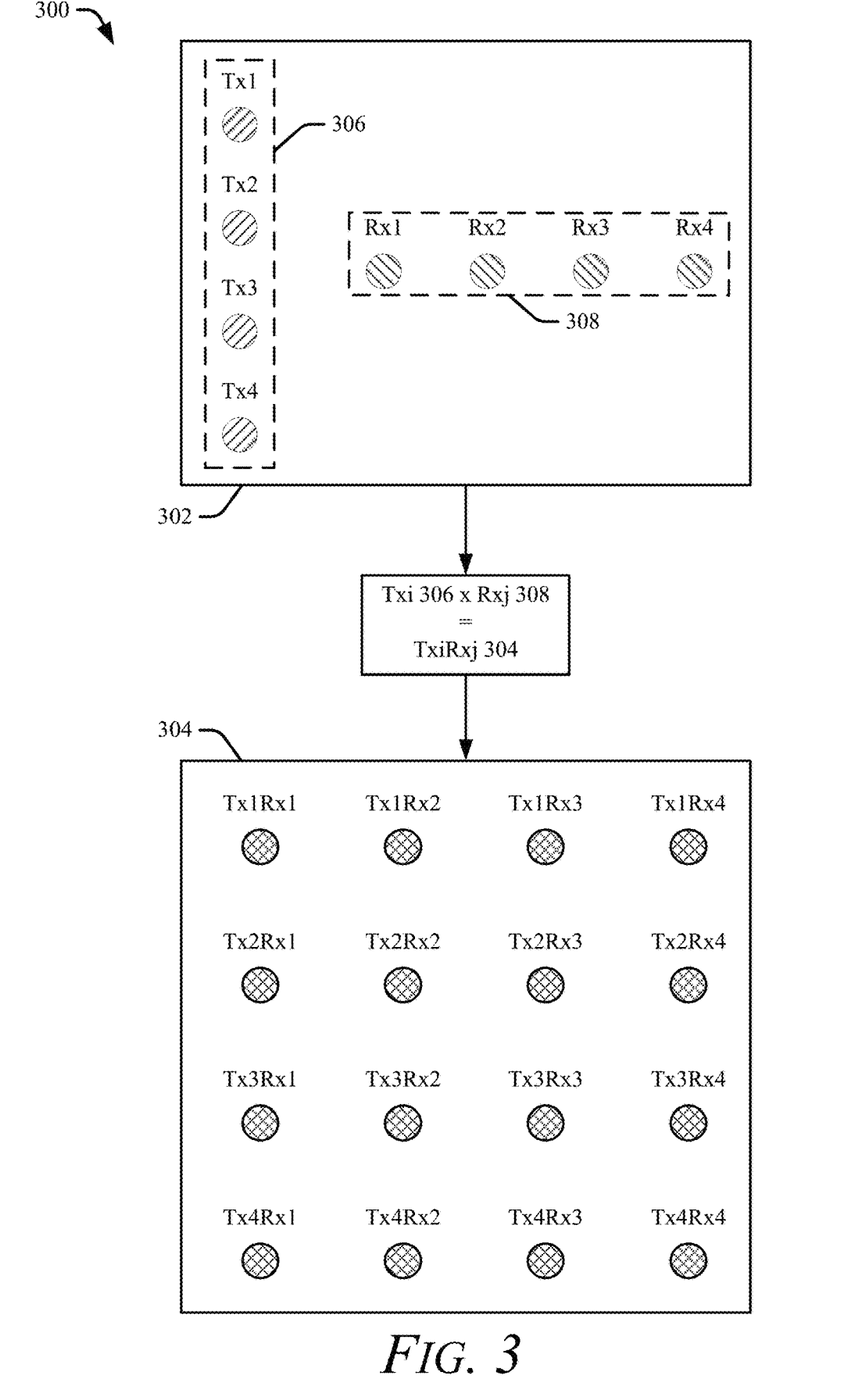
FIG. 3 illustrates a relationship between physical channels and virtual channels for independent transmit and receive channel calibration for a MIMO radar system, in accordance with techniques and systems of this disclosure.

FIG. 3 illustrates a relationship 300 between physical channels 302 and virtual channels 304 for independent transmit and receive channel calibration for a MIMO radar system, in accordance with techniques and systems of this disclosure. The physical channels 302 comprise one or more physical transmit channels 306 and one or more physical receive channels 308. In this example, there are four physical transmit channels (Tx1 through Tx4) 306 and four physical receive channels (Rx1 through Rx4); however, a quantity of physical transmit channels 306 and a quantity of physical receive channels 308 can be any quantity. Further, the physical transmit channels 306 and the physical receive channels 308 can be equal quantities or different quantities.

A quantity of virtual (transmit-receive) channels 304 is determined by multiplying the quantities of physical transmit channels 306 and physical receive channels 308. For example, FIG. 3 illustrates sixteen virtual channels 304 (Tx1Rx1 through Tx4Rx4), which is the product of the four physical transmit channels 306 and four physical receive channels 308.

The channel response of each virtual channel 304 measures a round trip of the electromagnetic energy transmitted and received by the associated physical transmit and receive channels for that virtual channel. Therefore, the channel response of each virtual channel 304 includes a transmit component and a receive component for mutual coupling that is equal to the mutual coupling between the associated physical transmit channel 306 and the physical receive channel 308. For example, the mutual coupling of the virtual channel Tx2Rx2 is affected by the physical neighboring channels of Tx2 and Rx2, and the mutual coupling of the virtual channel Tx3Rx2 is affected by the physical neighboring channels of Tx3 and Rx2. The receive component of the mutual coupling of these two virtual channels is the same (the mutual coupling component due to Rx2), but the transmit component of the mutual coupling of these two virtual channels is different. Tx2Rx2 has transmit component associated with Tx2, and Tx3Rx2 has a transmit component associated with Tx3. Further, neighboring virtual channels 304 (e.g., Tx2Rx2 and Tx3Rx2) can have a greater combined mutual coupling than virtual channels that are further apart (e.g., Tx1Rx1 and Tx4Rx4). The techniques and systems described herein separate the transmit and receive components of mutual coupling for each virtual channel in order to calibrate the physical transmit and receive channel arrays using respective calibration matrices for each physical array. The combined quantity of elements of the transmit calibration matrix for the transmit channel array 306 and the receive calibration matrix for the receive channel array 308 may be significantly less than the quantity of elements in a full calibration matrix for all of the virtual channels 304.

Example Methods

Figure 4:
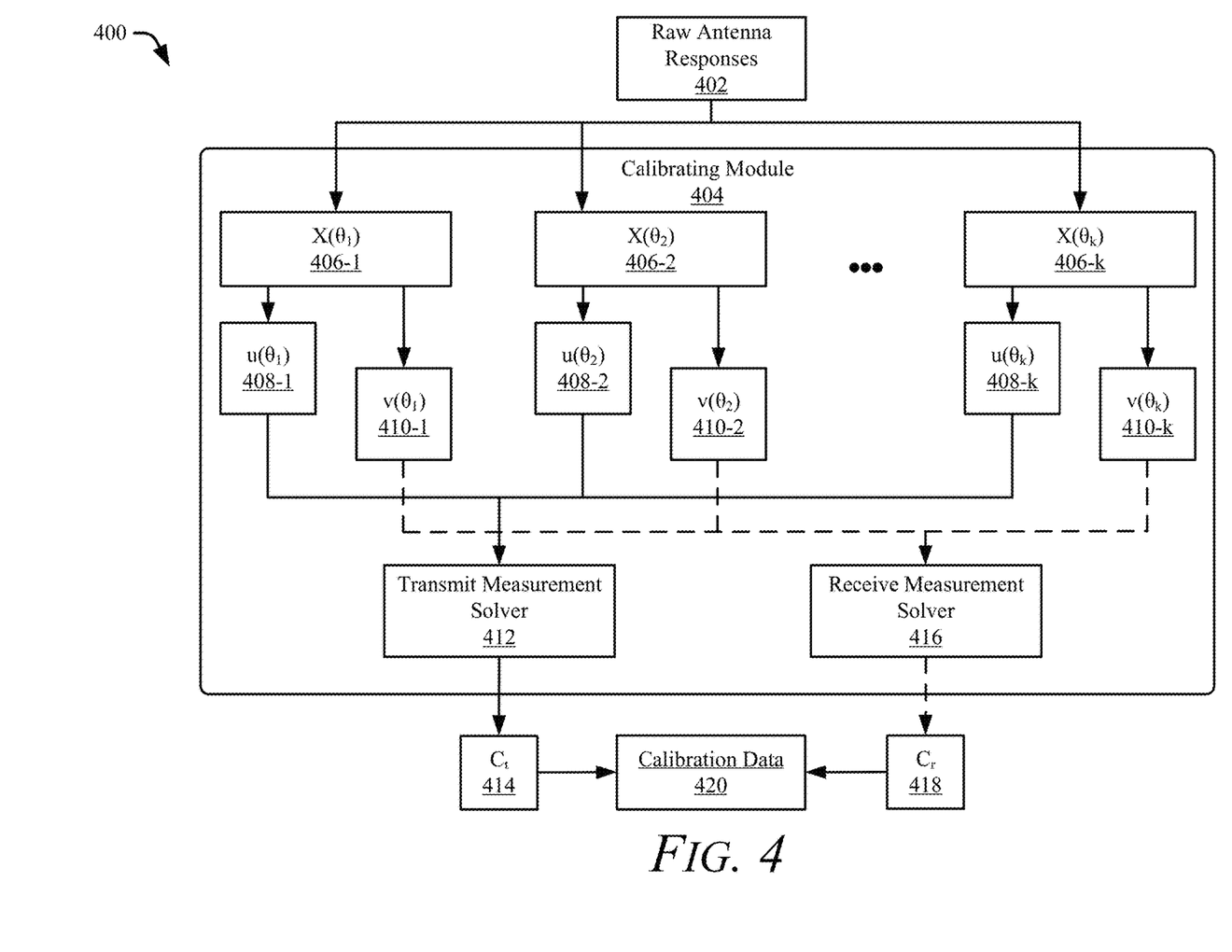
FIG. 4 illustrates a block diagram for implementing independent transmit and receive channel calibration for a MIMO radar system, in accordance with techniques and systems of this disclosure.

FIG. 4 illustrates a block diagram 400 for implementing independent transmit and receive channel calibration for a MIMO radar system, in accordance with techniques and systems of this disclosure. Raw antenna responses 402 for a MIMO radar system (e.g., the MIMO radar system 104, the MIMO radar system 204) are collected at one or more angles (e.g., $\theta_1$, $\theta_2$, to $\theta_k$) and provided to a calibrating module 404. As explained with reference to FIGS. 5 to 7, the calibrating module 404 executes a process (e.g., process 500 of FIG. 5, process 600 of FIG. 6, process 700 of FIG. 7) to generate separate transmit and receive calibration matrices for calibrating the MIMO radar system.

An observation matrix X($\theta_1$) 406-1 is generated that includes the channel responses taken at angle $\theta_1$. Similarly, observation matrices X($\theta_2$) 406-2 to X($\theta_k$) 406-k are generated to include the channel responses 402 taken at angles $\theta_2$ to $\theta_k$, respectfully. Each observation matrix is decomposed into transmit and receive components as transmit vectors 408 and receive vectors 410. For example, the observation matrix X($\theta_1$) 406-1 is decomposed into a transmit vector u($\theta_1$) 408-1 and a receive vector v($\theta_1$) 410-1. Likewise, observation matrices X($\theta_2$) 406-2 to X($\theta_k$) 406-k are decomposed into transmit vectors u($\theta_2$) 408-2 to u($\theta_k$) 408-k and receive vectors v($\theta_2$) 410-2 to v($\theta_k$) 410-k.

A transmit measurement solver 412 is configured to compare each of the transmit vectors 408 to an ideal steering vector at each collection angle ($\theta_1$, $\theta_2$, to $\theta_k$). The transmit measurement solver 412 does this by finding a preferred transmit calibration matrix 414 through solving Equation 1 for a minimum:

$$\|C_t U - A_t Z_t\|_F \quad \text{Equation 1}$$

In Equation 1, U=[u($\theta_1$), u($\theta_2$), . . . , u($\theta_k$)] and $A_t$=[$a_t(\theta_1)$, $a_t(\theta_2)$, . . . , $a_t(\theta_k)$]. $a_t(\theta_k)$ is the ideal steering vector of the transmit components at angle $\theta_k$.

Similarly, a receive measurement solver 416 is configured to compare each of the receive vectors 410 to an ideal steering vector at each collection angle ($\theta_1$, $\theta_2$, to $\theta_k$). The receive measurement solver 416 does this by finding a preferred receive calibration matrix 418 through solving Equation 2 for a minimum:

$$\|C_r V - A_r Z_r\|_F \quad \text{Equation 2}$$

In Equation 2, V=[v*($\theta_1$), v*($\theta_2$), . . . , v*($\theta_k$)] and $A_r$=[$a_r(\theta_1)$, $a_r(\theta_2)$, . . . , $a_r(\theta_k)$]. $a_r(\theta_k)$ is the ideal steering vector of the receive components at angle $\theta_k$.

The transmit calibration matrix 414 and the receive calibration matrix 418 may be stored as calibration data 420 for the MIMO radar system. The memory required for storing the transmit calibration matrix 414 and the receive calibration matrix 418 can be much less than the memory required to store a full calibration matrix for all of the virtual channels. Additionally, because the transmit calibration matrix 414 and the receive calibration matrix 418 are exponentially smaller than a full calibration matrix, far fewer computations may be required during the calibration process for the MIMO radar system.

Figure 5:
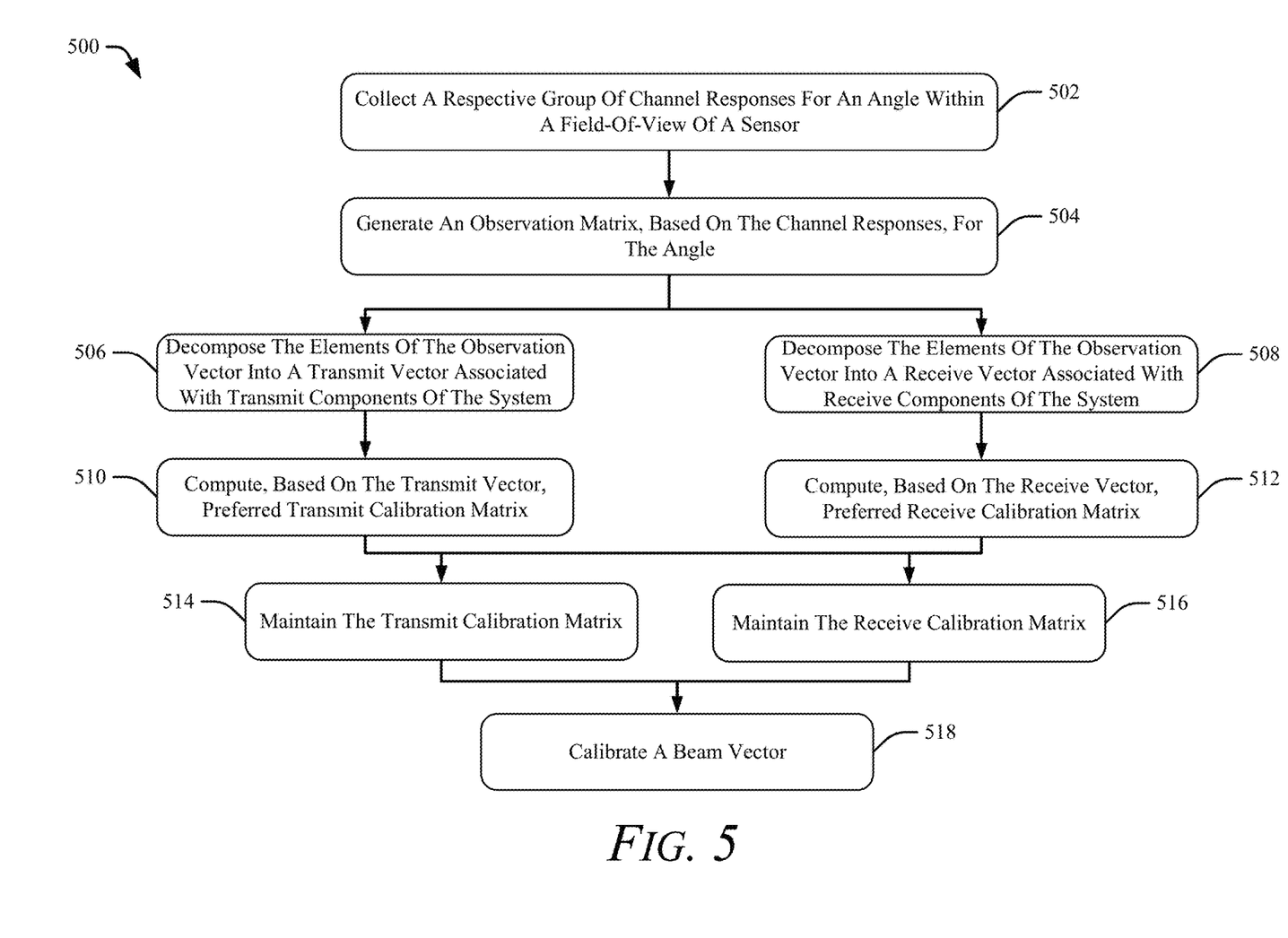
FIG. 5 illustrates an example method for implementing independent transmit and receive channel calibration for a MIMO radar system using a single angle, in accordance with techniques and systems of this disclosure.

FIG. 5 illustrates an example process 500 for implementing independent transmit and receive channel calibration for a MIMO radar system using a single angle, in accordance with techniques and systems of this disclosure. The operations (or steps) 502 through 518 of the process 500 are performed but are not necessarily limited to the order or combinations in which the operations are shown herein. Further, any of one or more of the operations may be repeated, combined, or reorganized to provide other operations.

At 502, channel responses for an angle within a field-of-view of a sensor are collected. These channel responses are based on signals obtained by a MIMO antenna array system. At 504, an observation matrix is generated. The elements of the observation matrix include the collection of channel responses (e.g., channel responses 106) collected at 502.

At 506 and 508, the elements of the observation matrix are decomposed into a transmit vector and a receive vector, respectfully. The transmit vector is associated with the transmit components of the MIMO antenna array system, and the receive vector is associated with the receive components of the MIMO antenna array system.

At 510, a preferred transmit calibration matrix, particular to the transmit components of the MIMO antenna array system, is computed based on the transmit vector. At 512, a preferred receive calibration matrix, particular to the receive components of the MIMO antenna array system, is computed based on the receive vector. At 514, the transmit calibration matrix is maintained in a CRM, and at 516, the receive calibration matrix is maintained in the CRM. The transmit calibration matrix and the receive calibration matrix can enable the sensor to calibrate a beam vector transmitted or received by the MIMO antenna array system.

At 518, the transmit calibration matrix and the receive calibration matrix are used to calibrate a beam vector for the MIMO antenna array system. The calibrated beam vector may approximate an ideal steering vector for the MIMO antenna array system.

Figure 6:
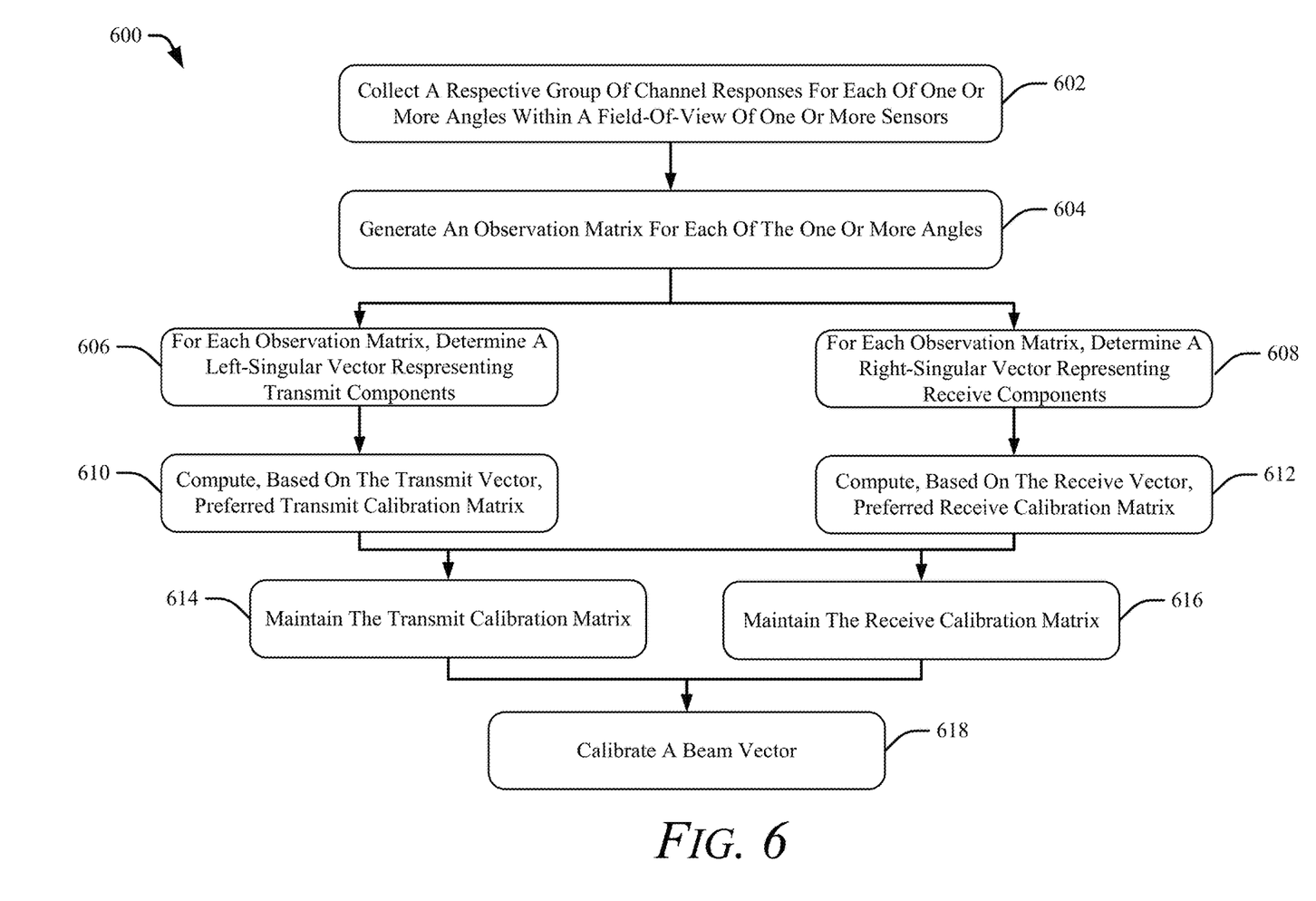
FIG. 6 illustrates an example method for implementing independent transmit and receive channel calibration for a MIMO radar system using multiple angles, in accordance with techniques and systems of this disclosure.

FIG. 6 illustrates an example process 600 for implementing independent transmit and receive channel calibration for a MIMO radar system using multiple angles, in accordance with techniques and systems of this disclosure. The operations (or steps) 602 through 618 of the process 600 are performed but are not necessarily limited to the order or combinations in which the operations are shown herein. Further, any of one or more of the operations may be repeated, combined, or reorganized to provide other operations.

At 602, channel responses for each of one or more angles within a field-of-view of one or more sensors are collected. These channel responses are based on signals obtained by one or more MIMO antenna array systems.

At 604, an observation matrix for each of the one or more angles is generated. Each observation matrix (generated for each of the one or more angles) includes an element for each of the channel responses in the respective group of channel responses for that angle. In some aspects, the observation matrix may be approximated by a rank-one matrix.

At 606, a left-singular vector of each observation matrix is determined. The left-singular vector of each observation matrix represents transmit components of the one or more MIMO antenna array systems.

At 608, a right-singular vector of each observation matrix is determined. The right-singular vector of each observation matrix represents receive components of the one or more MIMO antenna array systems. In some aspects, a left-singular vector from step 606 and a right-singular vector from step 608 may be determined by factoring each observation matrix using singular value decomposition. Further, a left-singular vector and a right-singular vector may be based on the largest singular value of the respective observation matrix.

At 610, a preferred transmit calibration matrix is computed based on the left-singular vectors associated with each of the one or more angles. The transmit calibration matrix is a minimum solution of Equation 3:

$$\min \|C_t U - A_t Z_t\|_F \qquad \text{Equation 3}$$

Similarly, at 612, a preferred receive calibration matrix is computed based on the right-singular vectors associated with each of the one or more angles. The receive calibration matrix is a solution of Equation 4:

$$\min \|C_r V - A_r Z_r\|_F \qquad \text{Equation 4}$$

At 614, the transmit calibration matrix is maintained in a CRM, and at 616, the receive calibration matrix is maintained in the CRM. The transmit calibration matrix and the receive calibration matrix can enable the one or more sensors to calibrate a beam vector transmitted or received by the one or more MIMO antenna array systems.

At 618, the transmit calibration matrix and the receive calibration matrix are used to calibrate a beam vector for each of the one or more MIMO antenna array systems. The calibrated beam vector may approximate an ideal steering vector for the one or more MIMO antenna array systems.

Figure 7:
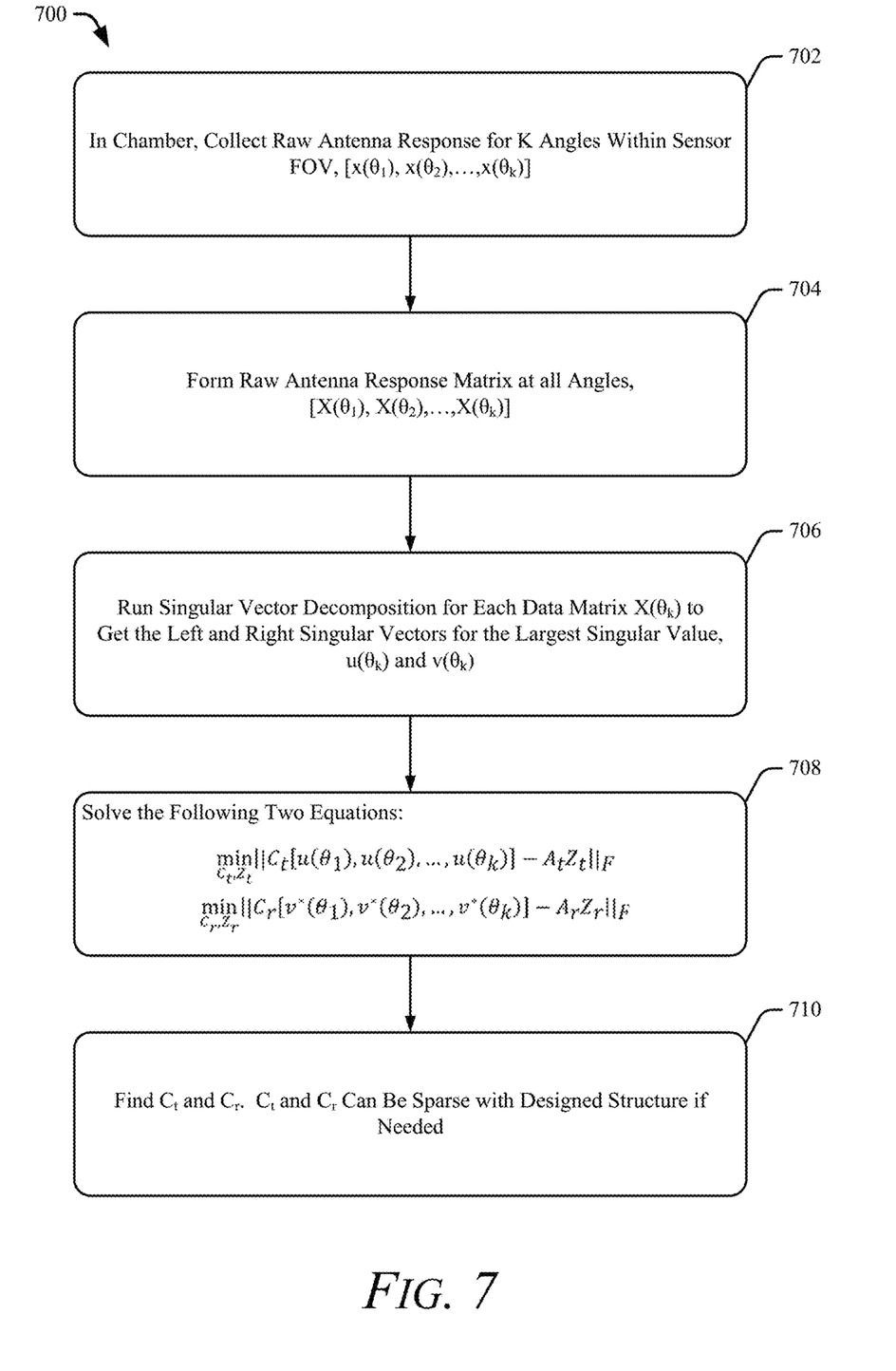
FIG. 7 illustrates an example detailed method for implementing independent transmit and receive channel calibration for a MIMO radar system, in accordance with techniques and systems of this disclosure.

FIG. 7 illustrates an example detailed process 700 for implementing independent transmit and receive channel calibration for a MIMO radar system, in accordance with techniques and systems of this disclosure. For a MIMO radar system (e.g., the MIMO radar system 104, the MIMO radar system 204) with N transmit channels and M receive channels, we have an NM×1 vector $x(\theta)$ as defined in Equation 5:

$$x(\theta) = \begin{bmatrix} x_{11} \\ \vdots \\ x_{N1} \\ x_{12} \\ \vdots \\ x_{N2} \\ \vdots \\ x_{NM} \end{bmatrix} \qquad \text{Equation 5}$$

In Equation 5, $x(\theta)$ is assumed to be a synthetic array response for an object at angle $\theta$, and $x(\theta)$ is an NM×1 vector. For a transmit antenna (Tx) and a receive antenna (Rx), the elements of $x(\theta)$ are mapped to respective responses given by Equations 6 to 8:

$$x_{11} \text{ to } x_{N1} = \text{response of } Rx1 \text{ and } Tx1 \text{ to } TxN \qquad \text{Equation 6}$$

$$x_{12} \text{ to } xN_2 = \text{response of } Rx2 \text{ and } Tx1 \text{ to } TxN \qquad \text{Equation 7}$$

$$x_{1M} \text{ to } x_{NM} = \text{response of } R \times M \text{ and } Tx1 \text{ to } TxN \qquad \text{Equation 8}$$

In MIMO antenna array calibration, the calibration matrix C is found according to Equation 9:

$$Cx(\theta) = a(\theta)z \qquad \text{Equation 9}$$

In Equation 9, C has the dimensions NM×NM, $a(\theta)$ is an ideal steering vector at angle $\theta$, and z is a complex scalar. The vector $a(\theta)$ can be represented as Equation 10:

$$a(\theta) = vec\left(a_t(\theta) \cdot a_r(\theta)^T\right) \qquad \text{Equation 10}$$

$$= vec\left(\begin{bmatrix} a_{11} & a_{12} & \cdots & a_{1M} \\ a_{21} & a_{22} & \cdots & a_{2M} \\ \vdots & \vdots & \ddots & \vdots \\ a_{N1} & a_{N2} & \cdots & a_{NM} \end{bmatrix}\right) \to vec(A(\theta))$$

According to Equation 10, $a_t(\theta)$ and $a_r(\theta)$ are ideal steering vectors for Tx and Rx. Vec(:) is the vectorize operation. The matrix $A(\theta)$ is a rank one matrix because it is a product of two vectors, as shown in Equation 11:

$$A(\theta) = a_t(\theta) \cdot a_r(\theta)^T \qquad \text{Equation 11}$$

The raw antenna response $x(\theta)$ can be rewritten as an NM×NM matrix $X(\theta)$ given in Equation 12:

$$X(\theta) = \begin{bmatrix} x_{11} & x_{12} & \cdots & x_{1M} \\ x_{21} & x_{22} & \cdots & x_{2M} \\ \vdots & \vdots & \ddots & \vdots \\ x_{N1} & x_{N2} & \cdots & x_{NM} \end{bmatrix} \qquad \text{Equation 12}$$

Therefore, by re-writing $X(\theta)$ as a combination of Equations 11 and 12, Equation 13 results:

$$X(\theta) = x_t(\theta) \cdot x_r(\theta)^T \qquad \text{Equation 13}$$

In Equation 13, $x_t(\theta)$ and $x_r(\theta)$ are the raw antenna response vectors for Tx and Rx, $C_t$ and $C_r$ can be computed so that Equations 14 are satisfied:

$$C_t x_t(\theta) = a_t(\theta) z_t$$

$$C_r x_r(\theta) = a_r(\theta) z_r \quad \text{Equations 14}$$

However, the raw antenna response data matrix $X(\theta)$ is often full rank. For $X(\theta)$ to be rank one, mutual couplings between Tx antennas and Rx antennas need to be zero, and there is only mutual coupling among the Tx antennas themselves and among the Rx antennas themselves. This assumption may be true for frequency-modulated continuous-wave (FMCW) radar systems where isolation between Tx and Rx is a necessary requirement in antenna and system design. Poor Tx and Rx isolation can lead to an increased noise floor and reduced sensitivity. Based on the assumption that there is very good isolation between Tx and Rx, $X(\theta)$ approximates a rank-one matrix. A singular value decomposition can be computed for $X(\theta)$ as shown in Equation 15:

$$X(\theta) = U\Sigma V^H \approx \sigma_1 u_1 v_1^H \quad \text{Equation 15}$$

Equation 15 assumes that $\sigma_1$ is the largest singular value and $u_1$ and $v_1$ are corresponding left and right singular vectors. Applying the above, and evaluating Equation 13, $X(\theta)$ can be decomposed into:

$X(\theta) = x_t(\theta) \cdot x_r(\theta)^T$, which leads to $$\begin{cases} x_t(\theta) = u_1 z_t \\ x_r(\theta) = v_1^* z_r \end{cases}$$

where $u_1$ and $v_1$ are normalized vectors from $x_t(\theta)$ and $x_r(\theta)$. The method in FIG. 7 is illustrated as a flowchart to compute $C_t$ and $C_r$ from sensor chamber measurements.

At 702, raw antenna responses for k angles within a sensor FOV are collected (e.g., $[x(\theta_1), x(\theta_2), \text{ to } x(\theta_k)]$). At 704, an antenna response matrix is formed at all angles measured (e.g., $[X(\theta_1), X(\theta_2), \text{ to } X(\theta_k)]$). These matrices may, likewise, be referred to as observation matrices. At 706, singular value decomposition is performed on each data matrix $X(\theta_k)$ to acquire the left-singular vector and the right-singular vector for the largest singular value, $u(\theta_k)$ and $v(\theta_k)$.

At 708, the following two equations 16 and 17 are solved:

$$\min_{C_t, Z_t} \|C_t[u(\theta_1), u(\theta_2), \ldots, u(\theta_k)] - A_t Z_t\|_F \quad \text{Equation 16}$$

$$\min_{C_r, Z_r} \|C_r[v^*(\theta_1), v^*(\theta_2), \ldots, v^*(\theta_k)] - A_r Z_r\|_F \quad \text{Equation 17}$$

Step 708 can be executed in the transmit measurement solver 412 and the receive measurement solver 416 in FIG. 4.

At 710, $C_t$ and $C_r$ are found. The matrices $C_t$ and $C_r$ can be sparse with a designed structure to further reduce computations.

After $C_t$ and $C_r$ are computed, a beam vector can be calibrated by forming a data matrix X and multiplying $C_t$ and $C_r$ left and right as shown in Equation 18:

$$vec(C_t \cdot X \cdot C_r^T) \quad \text{Equation 18}$$

A single calibration matrix C can be formed by Equation 19:

$$C = C_r \otimes C_t \quad \text{Equation 19}$$

The single calibration matrix C can then be applied to a beam vector x.

Applying the described techniques and systems may lead to increased efficiencies and increased flexibility in the calibration of a MIMO radar system. For example, computing a calibration matrix from chamber measurements may become more efficient. Less memory may be used when storing the calibration matrix in an embedded system. Calibrating a raw beam vector in angle finding may be more efficient. Additionally, the described techniques and systems may work in a bistatic chamber configuration, where $a_t(\varphi)$ and $a_r(\theta)$ are from different angles. Likewise, the described techniques and systems may work in a bistatic radar configuration where a transmit steering vector and a receive steering vector are from different angles and different radars, where the different transmitted and received signals cross paths.

Example Implementations

Figure 81:
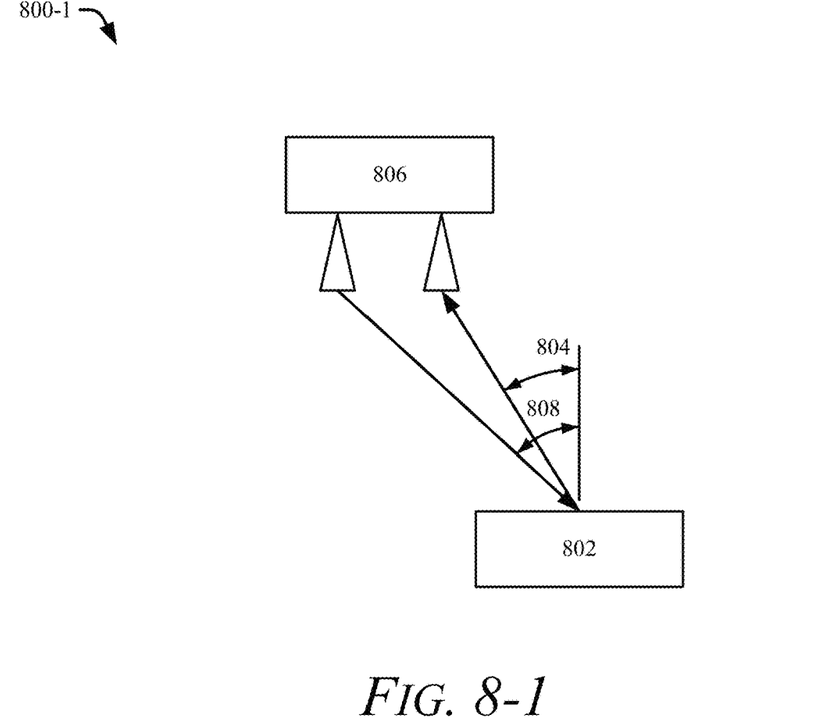

FIGS. 8-1 illustrates an example implementation 800-1 of independent transmit and receive channel calibration for a MIMO radar system using a bistatic chamber configuration, in accordance with techniques and systems of this disclosure. A MIMO radar system 802 (e.g., the MIMO radar system 104, the MIMO radar system 204), to be calibrated, transmits an electromagnetic signal at an angle 804. The electromagnetic signal is reflected by an object 806 and received by the MIMO radar system 802 at an angle 808. Although the angle 804 of transmission and the angle 808 of receiving are not equal, the techniques and systems described herein can still be applied.

Figure 82:
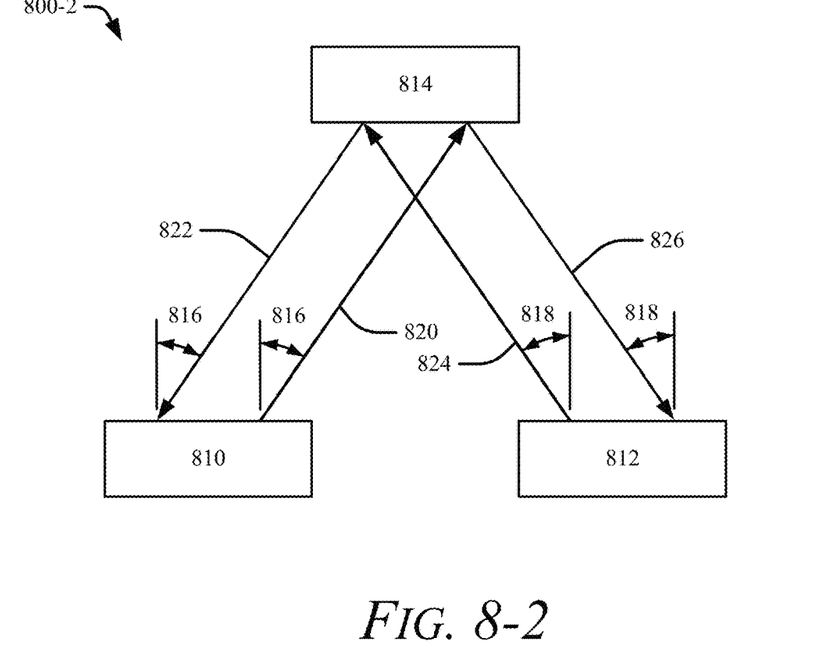

FIGS. 8-2 illustrates an example implementation 800-2 of independent transmit and receive channel calibration for a MIMO radar system using a bistatic radar configuration, in accordance with techniques and systems of this disclosure. MIMO radar systems 810 and 812 are positioned to detect an object 814 for calibration purposes. The MIMO radar systems 810 transmits and receives at an angle 816, and the MIMO radar systems 812 transmits and receives at an angle 818. There are four possible paths, two direct paths and two cross paths, for the electromagnetic signals being transmitted and received by the MIMO radar systems 810 and 812. The first direct path includes a transmission path 820 and a receive path 822 from MIMO radar system 810. This direct path represents a signal transmitted and received by MIMO radar system 810. Similarly, the second direct path represents a signal transmitted and received by MIMO radar system 812, characterized by the transmission path 824 and the receive path 826. Two cross paths can be also be represented. The first cross path occurs when the transmission signal from the MIMO radar system 810 is received by the MIMO radar system 812. The first cross path includes the transmission path 820 and the receive path 826. Conversely, the second cross path occurs when the transmission signal from the MIMO radar system 812 is received by the MIMO radar system 810. The second cross path includes the transmission path 824 and the receive path 822. Independent transmit and receive channel calibration for a MIMO radar system may have the flexibility to operate in this environment. Further, multiple MIMO radar systems that can create multiple direct paths and cross paths may be utilized.

The techniques and systems used to implement independent transmit and receive channel calibration for a MIMO radar system may enable increased efficiencies in the calibration of MIMO radar systems. By reducing the overall quantity of elements in the calibration matrices by an exponential factor, significantly fewer calibration computations and memory may be required, especially as the quantity of channels to be calibrated increases. Additionally, the described techniques and systems may work in a bistatic chamber configuration or in a bistatic radar configuration enabling more flexibility when calibrating MIMO radar systems.

ADDITIONAL EXAMPLES

Example 1: A method comprising: collecting, based on signals obtained via a multiple-input multiple-output (MIMO) antenna array system, channel responses for an angle within a field-of-view of a sensor; generating, based on the channel responses, an observation matrix including elements for each of the channel responses; decomposing the elements of the observation matrix into a transmit vector associated with transmit components of the MIMO antenna array system; decomposing the elements of the observation matrix into a receive vector associated with receive components of the MIMO antenna array system; computing, based the transmit vector, transmit calibration values particular to the transmit components of the MIMO antenna array system; computing, based the receive vector, receive calibration values particular to the receive components of the MIMO antenna array system; and maintaining the transmit calibration values and the receive calibration values as a respective transmit calibration matrix and receive calibration matrix for enabling the sensor to calibrate a beam vector transmitted or received via the MIMO antenna array system.

Example 2: The method of any preceding example, wherein the collected channel responses for the angle comprises channel responses of a plurality of virtual channels.

Example 3: The method of any preceding example, wherein a quantity of virtual channels is based on a product of a quantity of transmit antennas and a quantity of receive antennas.

Example 4: The method of any preceding example, wherein the observation matrix is approximated by a rank-one matrix.

Example 5: The method of any preceding example, wherein decomposing the observation matrix into the receive vector further comprises: factoring the observation matrix based on a singular value decomposition, wherein the transmit vector comprises a left-singular vector based on the singular value decomposition, and the receive vector comprises a right-singular vector based on the singular value decomposition.

Example 6: The method of any preceding example, wherein the left-singular vector and the right-singular vector are each based on a largest singular value from the singular value decomposition of the observation matrix.

Example 7: The method of any preceding example, wherein the transmit calibration matrix and the receive calibration matrix are sparse.

Example 8: The method of any preceding example, wherein the transmit calibration matrix and the receive calibration matrix have a predefined structure to reduce computations.

Example 9: The method of any preceding example, wherein the sensor comprises a radar sensor.

Example 10: A system comprising: one or more processors configured to: collect, based on signals obtained via a multiple-input multiple-output (MIMO) antenna array system, channel responses for an angle within a field-of-view of a sensor; generate, based on the channel responses, an observation matrix including elements for each of the channel responses; decompose the elements of the observation matrix into a transmit vector associated with transmit components of the MIMO antenna array system; decompose the elements of the observation matrix into a receive vector associated with receive components of the MIMO antenna array system; compute, based the transmit vector, transmit calibration values particular to the transmit components of the MIMO antenna array system; compute, based the receive vector, receive calibration values particular to the receive components of the MIMO antenna array system; and maintain the transmit calibration values and the receive calibration values as a respective transmit calibration matrix and receive calibration matrix for enabling the sensor to calibrate a beam vector transmitted or received via the MIMO antenna array system.

Example 11: The system of any preceding example, wherein the collected channel responses for the angle comprises channel responses of a plurality of virtual channels.

Example 12: The system of any preceding example, wherein a quantity of virtual channels is based on a product of a quantity of transmit antennas and a quantity of receive antennas.

Example 13: The system of any preceding example, wherein the observation matrix is approximated by a rank-one matrix.

Example 14: The system of any preceding example, wherein the one or more processors are further configured to decompose the observation matrix into a receive vector by at least: factoring observation matrix based on a singular value decomposition; the transmit vector comprises a left-singular vector based on the singular value decomposition; and the receive vector comprises a right-singular vector based on the singular value decomposition.

Example 15: The system of any preceding example, wherein the left-singular vector and the right-singular vector of the observation matrix is based on the largest singular value, based on the singular value decomposition, of that observation matrix.

Example 16: The system of any preceding example, wherein the transmit calibration matrix and the receive calibration matrix are sparse.

Example 17: The system of any preceding example, wherein the transmit calibration matrix and the receive calibration matrix have a predefined structure to reduce computations.

Example 18: The system of any preceding example, wherein the sensor comprises a radar sensor.

Example 19: A method comprising: collecting, based on signals obtained via a multiple-input multiple-output (MIMO) antenna array system, a respective group of channel responses for each of one or more angles within a field-of-view of one or more sensors; generating, based on the respective group of channel responses for the one or more angles, an observation matrix for each of the one or more angles, each observation matrix generated for each of the one or more angles including an element for each of the channel responses in the respective group of channel responses for that angle; determining a left-singular vector of each observation matrix generated for each of the one or more angles, the left-singular vector representing transmit components of the MIMO antenna array system; determining a right-singular vector of each observation matrix generated for each of the one or more angles, the right-singular vector representing receive components of the MIMO antenna array system; responsive to determining the left-singular vector of each observation matrix generated for each of the one or more angles, computing transmit calibration values that, when combined with the left-singular vector of each observation matrix, provide minimum values when compared to an ideal steering vector for the transmit components for each of the one or more angles represented by each observation matrix; responsive to determining the right-singular vector of each observation matrix generated for each of the one or more angles, computing receive calibration values that, when combined with the right-singular vector of each observation matrix, provide minimum values when compared to an ideal steering vector for the receive components for each of the one or more angles represented by each observation matrix; and maintaining the transmit calibration values and the receive calibration values as a respective transmit calibration matrix and receive calibration matrix for enabling the one or more sensors to calibrate a beam vector transmitted or received via the MIMO antenna array system.

Example 20: The method of any preceding example, wherein determining the left-singular vector and determining the right-singular vector comprises factoring the at least one observation matrix based on a singular value decomposition.

Example 21: A system comprising means for performing the method of any preceding example.

Example 22: A system comprising a processor configured to perform the method of any preceding example.

Example 23: A non-transitory computer-readable storage medium comprising instructions that, when executed, configure a processor to execute the method of any preceding example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with calibrating MIMO antenna arrays can occur in other systems. Therefore, although described as a way to improve calibration of a MIMO radar system, the techniques of the foregoing description can be applied to other systems that include MIMO antenna arrays.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
    collecting, based on signals obtained via a multiple-input multiple-output (MIMO) antenna array system, channel responses for an angle within a field-of-view of a sensor;
    generating, based on the channel responses, an observation matrix including elements for each of the channel responses, the observation matrix being approximated as a rank one matrix;
    decomposing, based on a singular value decomposition, the elements of the observation matrix into a left-singular vector associated with transmit components of the MIMO antenna array system and a right-singular vector associated with receive components of the MIMO antenna array system;
    computing, based on the left-singular vector, transmit calibration values particular to the transmit components of the MIMO antenna array system;
    computing, based on the right-singular vector, receive calibration values particular to the receive components of the MIMO antenna array system; and
    maintaining the transmit calibration values and the receive calibration values as a respective transmit calibration matrix and receive calibration matrix for enabling the sensor to calibrate a beam vector transmitted or received via the MIMO antenna array system.

2. The method of claim 1,
wherein the collected channel responses for the angle comprise channel responses of a plurality of virtual channels.

3. The method of claim 2,
wherein a quantity of virtual channels is based on a product of a quantity of transmit antennas and a quantity of receive antennas.

4. The method of claim 1,
wherein the left-singular vector and the right-singular vector are each based on a largest singular value from the singular value decomposition of the observation matrix.

5. The method of claim 1,
wherein the transmit calibration matrix and the receive calibration matrix are sparse.

6. The method of claim 5,
wherein the transmit calibration matrix and the receive calibration matrix have a predefined structure to reduce computations.

7. The method of claim 1,
wherein the sensor comprises a radar sensor.

8. A system comprising:
one or more processors configured to:
    collect, based on signals obtained via a multiple-input multiple-output (MIMO) antenna array system, channel responses for an angle within a field-of-view of a sensor;
    generate, based on the channel responses, an observation matrix, approximated by a rank one matrix, including elements for each of the channel responses, the observation matrix being approximated as a rank one matrix;
    decompose, based on a singular value decomposition, the elements of the observation matrix into a left-singular vector associated with transmit components of the MIMO antenna array system and a right-singular vector associated with receive components of the MIMO antenna array system;
    compute, based on the left-singular vector, transmit calibration values particular to the transmit components of the MIMO antenna array system;
    compute, based the right-singular vector, receive calibration values particular to the receive components of the MIMO antenna array system; and
    maintain the transmit calibration values and the receive calibration values as a respective transmit calibration matrix and receive calibration matrix for enabling the sensor to calibrate a beam vector transmitted or received via the MIMO antenna array system.

9. The system of claim 8,
wherein the collected channel responses for the angle comprise channel responses of a plurality of virtual channels.

10. The system of claim 9, wherein a quantity of virtual channels is based on a product of a quantity of transmit antennas and a quantity of receive antennas.

11. The system of claim 8, wherein the left-singular vector and the right-singular vector of the observation matrix are based on the largest singular value, based on the singular value decomposition, of that observation matrix.

12. The system of claim 8, wherein the transmit calibration matrix and the receive calibration matrix are sparse.

13. The system of claim 12, wherein the transmit calibration matrix and the receive calibration matrix have a predefined structure to reduce computations.

14. The system of claim 8, wherein the sensor comprises a radar sensor.

15. A method comprising:
collecting, based on signals obtained via a multiple-input multiple-output (MIMO) antenna array system, a respective group of channel responses for each of one or more angles within a field-of-view of one or more sensors;
generating, based on the respective group of channel responses for the one or more angles, an observation matrix for each of the one or more angles, each observation matrix generated for each of the one or more angles including an element for each of the channel responses in the respective group of channel responses for that angle;
determining a left-singular vector of each observation matrix generated for each of the one or more angles, the left-singular vector representing transmit components of the MIMO antenna array system;
determining a right-singular vector of each observation matrix generated for each of the one or more angles, the right-singular vector representing receive components of the MIMO antenna array system;
responsive to determining the left-singular vector of each observation matrix generated for each of the one or more angles, computing transmit calibration values that, when combined with the left-singular vector of each observation matrix, provide minimum values when compared to an ideal steering vector for the transmit components for each of the one or more angles represented by each observation matrix;
responsive to determining the right-singular vector of each observation matrix generated for each of the one or more angles, computing receive calibration values that, when combined with the right-singular vector of each observation matrix, provide minimum values when compared to an ideal steering vector for the receive components for each of the one or more angles represented by each observation matrix; and
maintaining the transmit calibration values and the receive calibration values as a respective transmit calibration matrix and receive calibration matrix for enabling the one or more sensors to calibrate a beam vector transmitted or received via the MIMO antenna array system.

16. The method of claim 15, wherein determining the left-singular vector and determining the right-singular vector comprises factoring each observation matrix based on a singular value decomposition.

17. The method of claim 15, wherein the left-singular vector and the right-singular vector of the observation matrix are based on the largest singular value of the observation matrix.

18. The method of claim 15, wherein the transmit calibration matrix and the receive calibration matrix are sparse.

19. The method of claim 15, wherein the method is executed in a calibration chamber.

20. The method of claim 15, wherein the calibration chamber is configured as a bistatic chamber.

* * * * *